US005889527A

United States Patent [19]

Tsai

[11] Patent Number: 5,889,527

[45] Date of Patent: Mar. 30, 1999

[54] IMAGE-PROCESSING APPARATUS FOR DISPLAYING OVERLAPPED IMAGES AND AN IMAGE-PROCESSING METHOD THEREIN

[75] Inventor: Rong-Chuan Tsai, Hsinchu, Taiwan

[73] Assignee: Winbond Electronics Corp., Hsinchu, Taiwan

[21] Appl. No.: 786,772

[22] Filed: Jan. 21, 1997

[30] Foreign Application Priority Data

Oct. 3, 1996 [TW] Taiwan ................................ 85112075

[51] Int. Cl.[6] ...................................................... G06F 15/00

[52] U.S. Cl. ............................................................ 345/435

[58] Field of Search .................................... 345/435, 113, 345/114, 157, 509, 515

[56] References Cited

U.S. PATENT DOCUMENTS 5,625,764 4/1997 Tsujimoto et al. ...................... 395/135

5,636,337 6/1997 Boenke et al. .......................... 395/135

*Primary Examiner*—Phu K. Nguyen

*Attorney, Agent, or Firm*—Ladas & Parry

[57] ABSTRACT

An image-processing apparatus for controlling the display of a plurality of overlapped image data. The image-processing apparatus includes a control key generator, an overlay control register, and two multiplexers. The control key generator generates a plurality of control keys according to the drawing position on the monitor screen. Each control key defines two display areas on the monitor screen. The combinations of these display areas on the monitor screen thus define a plurality of overlapped display areas. The overlay control register stores display model data, each corresponding to an overlapped display area and representing the image data type of that overlapped display area. A first selector retrieves the display model data of the overlapped display areas from the overlay control register by using the control keys. A second selector uses the display model data obtained from the first selector to select the corresponding image data.

38 Claims, 3 Drawing Sheets

| bits | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| display model data | OCR-15 | | OCR-14 | | OCR-13 | | OCR-12 | | OCR-11 | | OCR-10 | | OCR-9 | | OCR-8 | |

| bits | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| display model data | OCR-7 | | OCR-6 | | OCR-5 | | OCR-4 | | OCR-3 | | OCR-2 | | OCR-1 | | OCR-0 | |

| overlapped display area | WK2 | WK1 | CAK | CRK | display model data |
|---|---|---|---|---|---|
| 0 | 0 | 0 | 0 | 0 | OCR-0 |
| 1 | 0 | 0 | 0 | 1 | OCR-1 |
| 2 | 0 | 0 | 1 | 0 | OCR-2 |
| 3 | 0 | 0 | 1 | 1 | OCR-3 |
| 4 | 0 | 1 | 0 | 0 | OCR-4 |
| 5 | 0 | 1 | 0 | 1 | OCR-5 |
| 6 | 0 | 1 | 1 | 0 | OCR-6 |
| 7 | 0 | 1 | 1 | 1 | OCR-7 |
| 8 | 1 | 0 | 0 | 0 | OCR-8 |
| 9 | 1 | 0 | 0 | 1 | OCR-9 |
| 10 | 1 | 0 | 1 | 0 | OCR-10 |
| 11 | 1 | 0 | 1 | 1 | OCR-11 |
| 12 | 1 | 1 | 0 | 0 | OCR-12 |
| 14 | 1 | 1 | 0 | 1 | OCR-13 |
| 14 | 1 | 1 | 1 | 0 | OCR-14 |
| 15 | 1 | 1 | 1 | 1 | OCR-15 |

FIG. 4

IMAGE-PROCESSING APPARATUS FOR DISPLAYING OVERLAPPED IMAGES AND AN IMAGE-PROCESSING METHOD THEREIN

BACKGROUND OF THE INVENTION

1. Field of the Invention

The present invention relates in general to an apparatus and method for displaying overlapped computer graphics data. More specifically, this invention relates to a full-featured image-processing apparatus and method for displaying overlapped computer graphics data and video data in the desired display areas to faithfully convey the information contents of the displayed data for a multimedia computer system.

2. Description of the Prior Art

In most modern multimedia applications, there is an increasing number of different types of computer graphics data and video data that needs to be processed by a computer graphics processor. “Computer graphics data” herein refers to the graphical images generated by central processing units (CPUs), or graphics processors (sometimes referred to as the “graphics engine”) in a computer system. “Video data” refers to the pre-recorded video images imported into the computer. The computer graphics and video data, after been processed by the graphics engine, are directed to an image data selection control device in which a desirable set of computer graphics and video data will be selected for display according to a preset selection model. A digital-to-analog converter then converts the selected computer graphics or video data into analog red, blue and green signals and displays these data on the screen of a monitor.

With the increasing number of different types of computer graphics and video data and the increasingly more complicated conditions for image data selection control, the image data selection control hardware also becomes more and more complex, requiring a large number of logic gates for implementation. Thus, conventional hardware control circuitry can no longer handle all the possible overlapping display conditions. Therefore, approaches using conventional hardware circuitry as the sole graphical display selection mechanism may have insufficient capability to handle today’s demanding multimedia applications.

SUMMARY OF THE INVENTION

Therefore, it is an object of the invention to provide an image-processing apparatus and method which can handle the various possible image-overlapping conditions.

It is another object of the invention to provide an image-processing apparatus and method for displaying overlapped images, which provides for fast and easy access of the desired image data.

It is another object of the invention to provide a full-featured image overlay apparatus and method that requires only a small number of logic gates in the hardware circuitry to reduce hardware manufacturing costs.

In accordance with these goals, the invention provides an image-processing apparatus for controlling the overlapping display of a plurality of image data on a monitor screen. This image-processing apparatus includes a control key generator, an overlay control register, and two selectors. The control key generator generates a plurality of control keys according to the drawing positions on the monitor screen. Each control key divides the monitor screen into two display areas, with the first and the second area designated by a ‘0’ and ‘1’ value of the control key, respectively. The combination of these areas defines a plurality of overlapped areas on the monitor screen. The overlay control register contains a plurality of display model data for each overlapped display area, representing the image data types of the corresponding overlapped display area. The first selector retrieves the image display model data from the overlay control register for the overlapped display area selected by the control key. The second selector then retrieves the corresponding image data using the display model data obtained by the first selector.

The image-processing apparatus described above also includes a digital-to-analog converter to convert the image data obtained by the second selector into chromatic signals, that is, the red, blue, and green signals for the monitor.

The image-processing apparatus of the present invention also includes a logic mask device. When a hardware cursor control key is send to this logic mask device, it replaces the display model data output of the first selector, forcing the second selector to select the hardware cursor graphical data from the image data to maintain a continuous display of the hardware cursor pattern on the monitor.

Also, if one of the image data is the computer graphical data with a preset control bit, the control key generator utilizes this preset control bit to generate a color key or compares the computer graphical data with the color set by the computer graphical data to generate a color key. This color key defines an irregular display area.

Furthermore, if one of the image data is video data with a preset control bit, the control key generator utilizes this preset control bit to generate a chroma key or compares this video data with a color setting to generate a chroma key. This chroma key defines an irregular display region.

The present invention also provides an image-processing method, including the following steps. First, a plurality of control keys are generated according to the display position and the image data on the monitor screen. Each control key divides the monitor screen into two display areas. The combinations of these display areas designated by the control keys define a plurality of overlapped display areas. Next, an overlay control register is used to store a plurality of display model data for each overlapped display areas. The display model data designate the image data type of the corresponding overlapped display area. The image model data of the overlapped display area are retrieved from the overlay control register according to the control keys, and then the image data of the selected overlapped display area are obtained from the selected display model data.

If one of the image data is a hardware cursor graphical data, that is, when the control key of a hardware cursor is present, then the image model data of the overlapped display area is replaced by the image data of the hardware cursor, to force the selection of the graphical data of the hardware cursor.

Also, if one of the image data is computer graphics data with a preset control bit, the above mentioned procedure to generate the control key can utilize this preset control bit to generate a color key, or compare the computer graphics data with the preset color of the computer graphics data to generate a color key. This color key defines an irregular display area.

Furthermore, if one of the image data is video data with a preset control bit, then the above mentioned procedure to generate the control key can utilize this preset control bit to generate a chroma key or compare the video data with a preset color to generate a chroma key. This chroma key defines an irregular display area.

Finally, the procedure to generate the control key described above can compare the contents of the horizontal counter and the vertical counter of a cathode ray tube (CRT) controller with a preset display range to generate a window key. This window key defines a rectangular display area.

BRIEF DESCRIPTION OF THE DRAWINGS

The scope, characteristics, goals, as well as advantages of the present invention will be more fully described in the Detailed Description below and illustrated in the accompanying drawings, in which:

FIG. 4 illustrates a table showing the control keys and the display model data stored in the corresponding overlay control register of the overlapped display areas of the preferred embodiment of the present invention.

DETAILED DESCRIPTION OF THE PREFERRED EMBODIMENT

The present invention provides a full-featured image-processing apparatus for controlling the overlapping display of a plurality of image data on a monitor screen, using a plurality of control keys to determine the image data of several display areas on the computer monitor screen. Each control key defines two display areas on the monitor screen. The combinations of these display areas define a plurality of overlapped display areas on the monitor screen In the preferred embodiment, the image data processed by the full-featured image-processing apparatus includes computer graphics data, video-1 data, video-2 data, and hardware cursor data. The video-1 data is combined with the computer graphics data to form a blended data. However, this invention is by no means limited to process only the above mentioned types of image data. It is understood by those skilled in the art that other image data types required by practical applications can also be employed.

In this preferred embodiment, the full-featured image-processing apparatus utilizes four control keys: a color key, a chroma key, a window-1 key, and a window-2 key. The color key and the chroma key define irregular display areas, and the window-1 and window-2 keys define rectangular display areas. As previously described, each control key divides the monitor screen into two display areas. Therefore, the four control keys can define a maximum of 16 overlapped display areas, labeled with indices 0 to 15. It should be noted that, however, the number and characteristics of the control keys that this invention can employ are not limited by those mentioned in this preferred embodiment. It is understood by those skilled in the art that the number and type of control keys according to the requirements of the practical application at hand can also be employed.

Figures 1, 3:
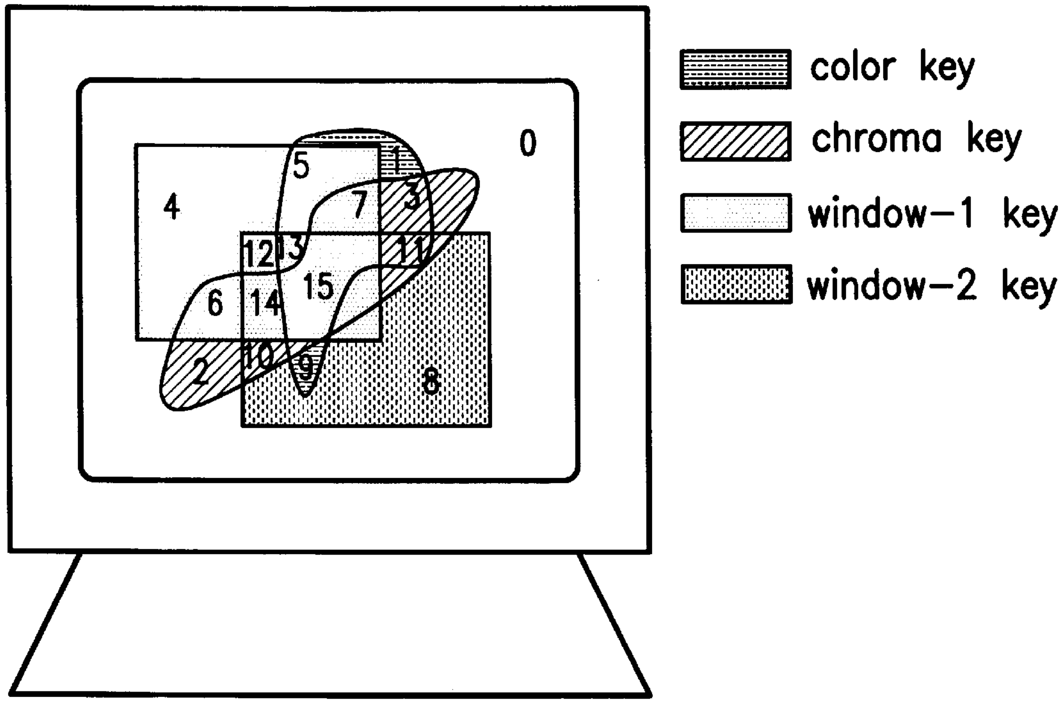
FIG. 1 schematically shows the overlapped display areas defined by a color key, a chroma key, a window-1 key, and a window-2 key on the monitor screen of the preferred embodiment according to the present invention.
FIG. 3 illustrates a table of data format of the overlay control register of the preferred embodiment of the present invention.

FIG. 1 schematically shows the overlapped display areas defined by the color key, chroma key, window-1 key, and window-2 key on the monitor screen of the preferred embodiment according to the present invention. The overlapped display areas are labeled by indices 0 to 15, and the extent of the overlapped display areas defined by each control key are represented by the different shading patterns shown in FIG. 1. For example, display area 0 is located outside the overlapped areas defined by any of the four control keys, and display area 14 is located within the overlapped display areas of the chroma key, window-1 key and window-2 key, and outside that of the color key. In this invention, each overlapped display area can specify its desired image data.

Figure 2:
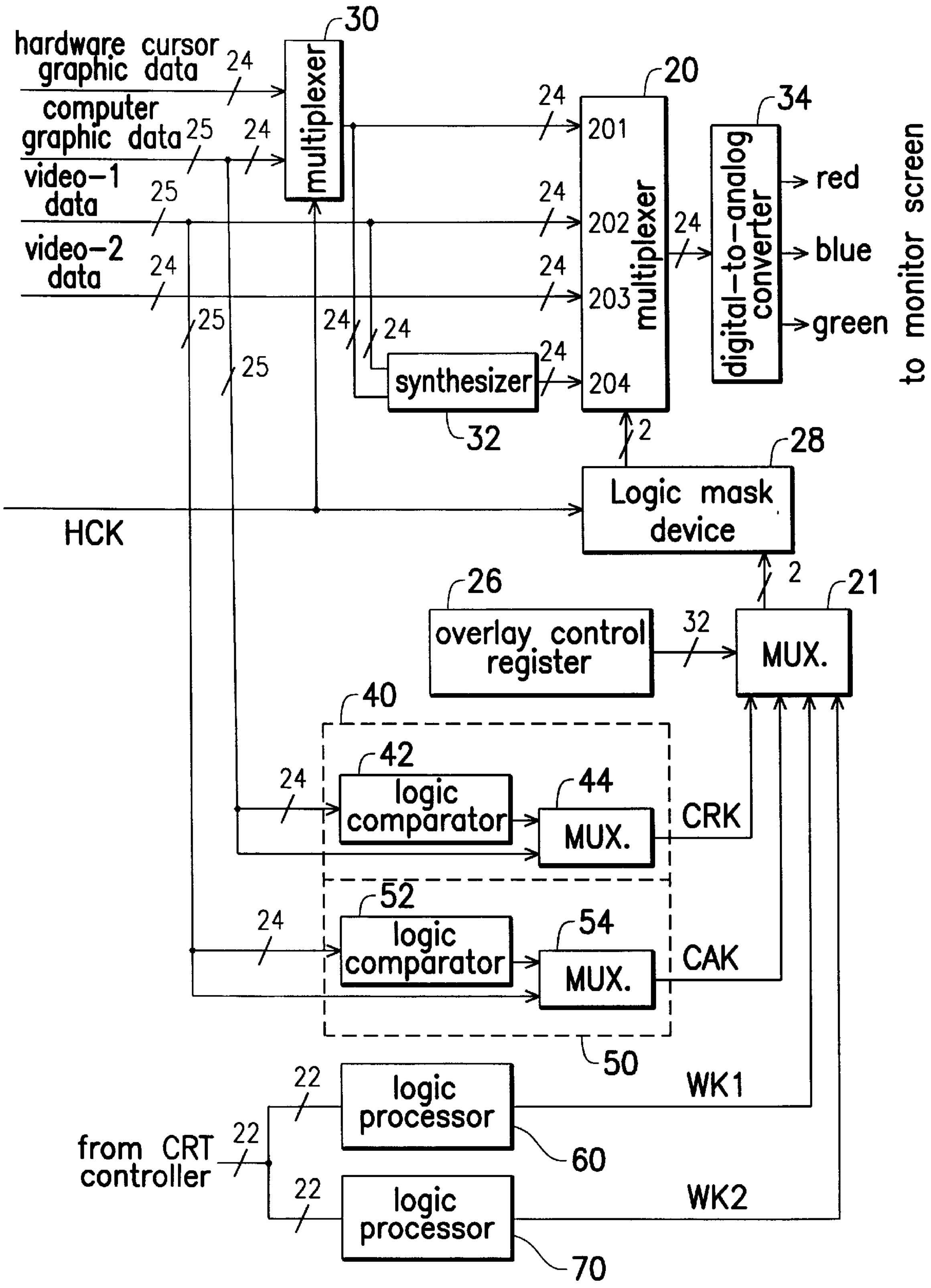
FIG. 2 is a block diagram of the full-featured image-processing apparatus in accordance with a preferred embodiment of the present invention.

FIG. 2 shows in block diagram form a full-featured image-processing apparatus according to the present invention. The bit numbers of digital data and control buses are designated by the numbers adjacent to the slashes on the lines representing the buses. Buses without labeling have a one-bit bus width. The full-featured image-processing apparatus consists of multiplexers 20 and 21, overlay control register 26, and control key generators for color key CRK, chroma key CAK, window-1 key WK1 and window-2 key WK2.

In this preferred embodiment, the width of all the control keys is one bit. The two display areas defined by each control key are designated by the value 0 and 1 of the control key. When the scanning position is inside a area defined by one of the control keys, the value of that control key would be a logical 1, otherwise, the value of that control key is a logical 0. Therefore, all of the overlapped display areas in FIG. 1 can be represented by the logical combination of the four control keys, namely, the combination of color key CRK, chroma key CAK, window-1 key WK1, and window-2 key WK2. Overlay control register 26 is used to define the display model data of each of the overlapped display areas. That is, it controls the image data type to be displayed in each overlapped display area. In this preferred embodiment, overlay control register 26 has 32 bits which are subdivided into 16 display model data (OCR-0 to OCR-15) corresponding to the 16 overlapped display areas in the monitor screen as shown in FIG. 3. Each display model data has 2 bits to represent four different types of image data.

Multiplexer 20 and 21 are two significant components of the image-processing apparatus of this invention. When the electron gun of the monitor is scanning the monitor screen, the four control keys CRK, CAK, WK1, and WK2 were each assigned a logical value according to the current scan position. Multiplexer 21 is a 16:1 multiplexer, with a width of 2 bits for each channel. It utilizes color key CRK, chroma key CAK, window-1 key WK1 and window-2 key WK2 as the selection inputs to select the display model data of the overlapped display areas from one of the 16 display model data stored in overlay control register 26. The display model data selected by multiplexer 21 is then sent to multiplexer 20, where it is used as the selection input to select one of the image data from inputs 201, 202, 203, and 204 of multiplexer 20. The selected image data is sent to digital-to-analog converter 34 to generate the red, blue, and green analog signal for the computer monitor.

FIG. 4 is a table showing the value of the control keys (WK2, WK1, CAK, CRK) and their corresponding display model data (OCR-0~OCR-15) stored in the overlay control register. For example, when the combined control key has a value of (0,0,0,0), it represents that the current scanning position is within overlapped display area 0. Therefore, the selection input of multiplexer 20 will be the display model data OCR-0. Similarly, if the combined control key has a value of (0,0,0,1), then the current scanning position is within overlapped display area 1, and the selection input of multiplexer 20 is the display model data OCR-1. When the selection input of multiplexer 20 has a value of 00, 01, 10, or 11, it transmits the image data from input 201, 202, 203, or 204 to digital-to-analog converter 14, respectively. Using this mechanism, each overlapped display area on the screen can be assigned a specific image data.

Multiplexer 30 and logic mask device 28 are designed specifically for the display of hardware cursor graphics data. The hardware cursor is commonly used in systems with graphical user interfaces. Usually, special circuits are used for cursor control to off-load the position calculation and drawing operation from the CPU to improve the performance of the system. Since the cursor must be displayed on top of all the other graphical data, this preferred embodiment employs special circuitry to handle the display of the hardware cursor. Nevertheless, it can be processed by a method identical to the method used to process all other kinds of graphical data, and the hardware cursor control method described below does not limit the scope of the present invention. As shown in FIG. 2, when the logical state of hardware cursor key HCK is 0, the computer graphical data will be selected from multiplexer 30 and transmitted to the input 201 of the multiplexer 20, and the operation to select the image data for each overlapped area is identical to that described earlier. However, if the logical state of HCK is 1, then multiplexer 30 selects and transmits the graphics data of the hardware cursor to the input 201 of the multiplexer 20. Also, logic mask device 28 masks the display model data from multiplexer 21, and outputs a selection signal to multiplexer 20 to force it to select and transmit the hardware cursor graphical data from input 201 to digital-to-analog converter 34. Therefore, the graphical data of the hardware cursor will be displayed on top of all the other image data within the area designated for the hardware cursor.

In this preferred embodiment, the four inputs of multiplexer 20 receive four different types of image data. Input 201 receives either hardware cursor graphical data or computer generated graphical data. Input 202 receives video-1 data, input 203 receives video-2 data, and input 204 receives blended data from the synthesizer 32. The blended data is generated from the weighted average of the computer graphical data and video-1 data, i.e., blended data=[(computer graphical data)×W1+(video-1 data)×W2]/(W1+W2). The blended data of the computer graphical data and video data can be used for the fade-in and fadeout special effects.

As shown in FIG. 2, logic processor 40 is composed of logic comparator 42 and multiplexer 44, and utilizes the computer graphical data to generate the color key CRK; logic processor 50 is composed of logic comparator 52 and multiplexer 54, and utilizes video-1 data to generate the chroma key CAK; and finally logic processors 60 and 70 generate window keys WK1 and WK2, respectively.

The computer graphics data input has 25 bits, in which 24 bits were used to transmit digital image data, and the remaining bit is a preset control bit of the computer graphics data. The logical state of the preset control bit directly defines an irregular display area on the screen. There are two methods to generate the color key CRK, and multiplexer 44 determines which method will be used: the first method is to utilize the preset control bit to set the color key, and the second method is to utilize the logic comparator 42 to compare the digital image data and the color setting of the computer graphics data to generate the color key. If the digital image data and the color setting have identical value, logic comparator 42 generates and transmits a logic state 1 to multiplexer 44, otherwise, it generates and transmits a logic state 0. Multiplexer 44 selects either the color key generated by the preset control bit of the image data or the color key from the output of logic comparator 42. Logic processing device 50 generates the chroma key CAK in a similar manner: multiplexer 54 selects the chroma key from the preset control bit in the video-1 input, or the chroma key generated by comparing the video-1 data and the color setting of the video-1 input. In summary, the display areas defined by the color key CRK and the chroma key CAK of this preferred embodiment can be defined by either the preset control bit or the color or chroma settings of the image data. Thus, the display areas defined by CRK or CAK can be of irregular shapes.

Logic processing devices 60 and 70 generate window control keys. These devices compare the values of the horizontal and vertical counter of the CRT controller with a preset range to generate the window control keys. Both the horizontal and vertical counters are 11 bits counters. The value of the combined 22 bits register indicates the current scanning position. If the logic processing devices 60 and 70 determined that the current scanning position is within the preset range, the corresponding control key will be set to the logical state of 1, otherwise, it is set to 0. The display range can be defined by the coordinates of the two diagonal points of the rectangular display area.

The full-featured image-processing apparatus and his invention described above has the following advantages:

1. The full-featured image overlay function can easily and rapidly select and display the desired image data in the overlapped display areas on the monitor screen, and provides more flexibility than conventional methods with limited image overlay capability.

2. The hardware circuit of the full-featured image-processing apparatus of the present invention requires less logic gates, hence the manufacturing cost of the device is lower, making it more suitable for mass production.

The principle and design of the present invention were disclosed and illustrated with a specific preferred embodiment. Nevertheless, the details of the preferred embodiment discussed above were not meant to limit the scope of the present invention. The scope of the present invention will be defined in the following claims.

What is claimed is:

1. An image-processing apparatus for displaying a plurality of overlapped image data on a computer monitor screen comprising:

a control key generating device for generating a plurality of control keys according to the image data and display position on the monitor screen, said control keys each dividing said monitor screen into two display areas, and the combination of said display areas defining a plurality of overlapped display areas;

an overlay control register for storing a plurality of display model data, one for each overlapped display area, said display model data defining the image data source to be selected for the corresponding overlapped display area;

a first selector, utilizing said control keys for selecting the display model data corresponding to a particular overlapped display area; and a second selector, utilizing the display model data selected by said first selector for selecting the corresponding image data.

2. The image-processing apparatus of claim 1, further comprising a digital-to-analog converter for converting said digital image data selected by said second selector into analog color signals for the display monitor.

3. The image-processing apparatus of claim 1, wherein one of said image data is hardware cursor graphics data.

4. The image-processing apparatus of claim 3, further comprising a logic mask device for masking display model data outputted from said first selector to force said second selector selecting said hardware cursor graphics data if a hardware cursor key is sent to said logic mask device.

5. The image-processing apparatus of claim 1, wherein one of said image data is computer graphics data.

6. The image-processing apparatus of claim 5, wherein said computer graphics data is compared with a color setting of said computer graphics data for generating a color key of said control keys, said color key defining an irregular display area on the monitor screen.

7. The image-processing apparatus of claim 1, wherein one of said image data is video data.

8. The image-processing apparatus of claim 7, wherein said video data is compared with a chroma setting of said video data for generating a chroma key of said control keys, said chroma key defining an irregular display area on the monitor screen.

9. The image-processing apparatus of claim 1, wherein one of said image data is blended data.

10. The image-processing apparatus of claim 9, further comprising a synthesis device for combining graphics data and video data by weighted average of the two image data.

11. The image-processing apparatus of claim 1, wherein one of the image data is computer graphics data with a preset control bit.

12. The image-processing apparatus of claim 11, wherein said preset control bit is utilized for generating a color key of said control keys, said color key defining an irregular display area.

13. The image-processing apparatus of claim 11, wherein said computer graphics data is compared with a color setting of said computer graphics data for generating a color key of said control keys, said color key defining an irregular display area.

14. The image-processing apparatus of claim 1, wherein one of said image data is video data with a preset control bit.

15. The image-processing apparatus of claim 14, wherein said preset control bit is utilized for generating a chroma key of said control keys, said chroma key defining an irregular display area on the monitor screen.

16. The image-processing apparatus of claim 14, wherein said video data is compared with a chroma setting of said video data for generating a chroma key of the control keys, said chroma key defining an irregular display area on the monitor screen.

17. The image-processing apparatus of claim 1, wherein a window key is generated by comparing horizontal and vertical positions controlled by a CRT controller with a preset display range.

18. The image-processing apparatus of claim 17, wherein said window key defines a rectangular display area.

19. The image-processing apparatus of claim 1, wherein said first selector is a multiplexer.

20. The image-processing apparatus of claim 1, wherein said second selector is a multiplexer.

21. An image-processing method for displaying a plurality of image data on a monitor screen comprising the steps of:

generating a plurality of control keys by using display positions on said monitor screen and said image data, each control key defining two display areas on the monitor screen, the combination of the display areas defined by all the control keys defining a plurality of overlapped display areas on the monitor screen;

providing an overlay control register, said overlay control register storing a plurality of display model data, one corresponding to each overlapped display area, each of said display model data representing an image data source for said corresponding display area;

selecting one of the display model data for each said overlapped display areas by using said control keys; and selecting one of said image data sources for each said overlapped display areas by using said selected display model data.

22. The image-processing method of claim 21, further comprising the step of converting said selected image data into analog color signals for said monitor screen.

23. The image-processing method of claim 21, wherein one of said image data is hardware cursor graphics data.

24. The image-processing method of claim 23, wherein if a hardware cursor control key is present, said selected display model data is masked and said hardware cursor graphics data is selected.

25. The image-processing method of claim 21, wherein one of said image data is computer graphics data with a preset control bit.

26. The image-processing method of claim 25, wherein generating a color key of said control keys by using said preset control bit of said computer graphics data, said color key defining an irregular display area.

27. The image-processing method of claim 25, wherein the step of generating said control keys further comprises comparing said computer graphics data with a color setting of said computer graphics data for generating a color key of said control keys, said color key defining an irregular display area.

28. The image-processing method of claim 21, wherein one of said image data is computer graphics data.

29. The image-processing method of claim 28, wherein the step of generating said control keys further comprises comparing said computer graphics data with a color setting of said computer graphics data for generating a color key of said control keys, said color key defining an irregular display area.

30. The image-processing method of claim 21, wherein one of said image data is video data with a preset control bit.

31. The image-processing method of claim 30, wherein the step of generating said control keys further comprises generating a chroma key of said control keys by using said preset control bit of said video data, said chroma key defining an irregular display area.

32. The image-processing method of claim 30, wherein the step of generating said control keys further comprises comparing said video data with a chroma setting of said video data for generating a chroma key of said control keys, said chroma key defining an irregular display area.

33. The image-processing method of claim 21, wherein one of said image data is video data.

34. The image-processing method of claim 33, wherein the step of generating said control keys further comprises comparing said video data with a chroma setting of said video data for generating a chroma key of said control keys, said chroma key defining an irregular display area.

35. The image-processing method of claim 21, wherein the step of generating said control keys further comprises comparing horizontal and vertical positions controlled by a CRT controller of said monitor with a preset display range for generating a window key of said control keys.

36. The image-processing method of claim 35, wherein said window key defines a rectangular display area.

37. The image-processing method of claim 21, wherein one of said image data is blended data.

38. The image-processing method of claim 37, wherein the step of generating said blended data further comprises combining a computer graphics data and a video data by weighted averaging.

* * * * *